United States Patent [19]

Deyrup et al.

[11] Patent Number: 4,758,629
[45] Date of Patent: Jul. 19, 1988

[54] THERMOPLASTIC COMPOSITIONS OF CRYSTALLINE POLYOLEFIN AND ETHYLENE-CONTAINING COPOLYMER

[75] Inventors: Edward J. Deyrup, Northeast, Md.; Coretta C. Tam, Hockessin, Del.

[73] Assignee: E. I. Du Pont de Nemours and Company, Wilmington, Del.

[21] Appl. No.: 867,436

[22] Filed: May 28, 1986

[51] Int. Cl.$^4$ .................. C08L 23/04; C08L 23/10; C08L 23/26; C08L 33/14
[52] U.S. Cl. .................. 525/194; 525/195; 525/208; 525/913; 524/517
[58] Field of Search .................. 525/194, 208, 913

[56] References Cited

U.S. PATENT DOCUMENTS

| | | | |
|---|---|---|---|
| 3,915,929 | 10/1975 | Kishikawa et al. | 260/42.18 |
| 3,952,136 | 4/1976 | Yoshikawa et al. | 428/463 |
| 4,116,914 | 9/1978 | Coran et al. | 525/222 |
| 4,206,096 | 6/1980 | Takagi | 216/18 N |
| 4,555,546 | 11/1985 | Patel | 525/194 |
| 4,696,967 | 9/1987 | Shedd et al. | 524/437 |

FOREIGN PATENT DOCUMENTS

| | | |
|---|---|---|
| 0000783 | 8/1978 | European Pat. Off. . |
| 3443959 | 6/1986 | Fed. Rep. of Germany . |
| 040582 | 12/1982 | Japan . |
| 59156881 | 2/1986 | Japan . |
| 1481764 | 8/1977 | United Kingdom . |
| 2099639 | 12/1982 | United Kingdom . |

*Primary Examiner*—Carman J. Seccuro

[57] ABSTRACT

A melt processible multi-phase thermoplastic composition comprising a blend of:

(A) 5-95 parts by weight of a crystalline polyolefin resin of a substantially saturated homopolymer or copolymer of polymerized monomer units of $C_2$-$C_8$ alpha monoolefins forming one phase of the composition, (B) 5-95 parts by weight of a crosslinked ethylene-containing copolymer forming a second phase of the composition comprising units derived from (1) ethylene, (2) alkyl acrylates or alkyl methacrylates wherein the alkyl group contains 1-6 carbon atoms or vinyl esters of monocarboxylic acids having 2-6 carbon atoms, and (3) glycidyl acrylate or glycidyl methacrylate.

34 Claims, No Drawings

THERMOPLASTIC COMPOSITIONS OF CRYSTALLINE POLYOLEFIN AND ETHYLENE-CONTAINING COPOLYMER

BACKGROUND OF THE INVENTION

This invention relates to a novel melt processible, multi-phase thermoplastic composition of a crystalline polyolefin resin, a crosslinked ethylene-containing copolymer having units derived from glycidyl methacrylate or glycidyl acrylate and a method for making such thermoplastic compositions.

Blends of plastics and elastomers are generally not compatible with each other and the resulting compositions have unsatisfactory physical properties. Blends of nonpolar plastics and polar elastomers normally require the incorporation therein of a compatibilizing agent in order to obtain satisfactory physical properties. The addition of a compatibilizing agent adds to the expense of the blend and makes the process for making such blends more complicated. Frequently, the elastomer component of such a blend is uncured which results in a composition having high compression set and high oil swell. However, it is advantageous to blend crystalline polymers with certain elastomers in such a manner that they are compatible with each other and result in thermoplastic elastomer compositions that have good elastomeric characteristics and stress-strain properties, e.g., high tensile and tear strength, high compression set resistance and permanent set resistance, high percent elongation, adequate low and high temperature properties, and oil resistance.

It is important, especially from an economic standpoint that the thermoplastic compositions are easily processible on thermoplastic equipment with little or no modification. Further, scrap material of the thermoplastic compositions should be capable of being reground and reprocessed with substantially no significant change in the physical properties of the thermoplastic composition.

SUMMARY OF THE INVENTION

The present invention is directed to a thermoplastic composition having excellent tensile strength and compression set resistance, while, at the same time, the compositions have adequate tear strength, percent elongation and the scrap material is reusable. More specifically, this invention is directed to a melt processible multi-phase thermoplastic composition comprising a blend of:

(A) 5-95 parts by weight of a crystalline polyolefin resin of a substantially saturated homopolymer or copolymer of polymerized monomer units of $C_2-C_8$ alpha monoolefin, preferably ethylene or propylene or mixtures thereof, forming one phase of the composition, and (B) 5-95 parts by weight of a crosslinked ethylene-containing copolymer forming a second phase of the composition comprising units derived from: (1) ethylene, (2) alkyl acrylates or alkyl methacrylates wherein the alkyl group contains 1-6 carbon atoms, preferably butyl acrylate, or vinyl esters of monocarboxylic acids having 2-6 carbon atoms, preferably vinyl acetate, and (3) glycidyl acrylate or glycidyl methacrylate.

The melt processible multi-phase thermoplastic composition can be prepared by mixing and shearing the uncrosslinked ethylene-containing copolymer (ethylene/alkyl acrylates or alkyl methacrylates or vinyl esters of monocarboxylic acids/glycidyl acrylate or glycidyl methacrylate) with the crystalline polyolefin resin and a crosslinking agent for the ethylene-containing copolymer, preferably in a high shear mixer, and carrying out crosslinking of the ethylene-containing copolymer simultaneously with the mixing operation. In order for the compositions to process well as thermoplastics, the crosslinked ethylene-containing copolymer component should be dispersed in the thermoplastic polyolefin resin.

More specifically, a preferred process for making a melt processible multi-phase thermoplastic composition of a blend of a crystalline polyolefin resin and a crosslinked ethylene-containing copolymer comprises:

(1) adding to a mixer (A) 5-95 parts by weight of a crystalline polyolefin resin of a substantially saturated homopolymer or copolymer of polymerized monomer units of a $C_2-C_8$ alpha monoolefin, preferably polyethylene, polypropylene or copolymers thereof, and (B) 5-95 parts by weight of an uncrosslinked ethylene-containing copolymer comprising units derived from (1) ethylene; (2) alkyl acrylate or alkyl methacrylate wherein the alkyl group contains 1-6 carbon atoms, preferably butyl acrylate, or vinyl esters of monocarboxylic acids having 2-6 carbon atoms, preferably vinyl acetate, and (3) glycidyl acrylate or glycidyl methacrylate;

(C) a crosslinking agent for the ethylene-containing copolymer, and (2) mixing and shearing the composition at a temperature sufficient to soften the polyolefin resin and to crosslink and comminute said ethylene-containing copolymer resulting in the crosslinked ethylene-containing copolymer being dispersed as a second phase throughout the crystalline polyolefin resin.

The melt processible multi-phase thermoplastic compositions are reprocessible and can be formed into various shapes by conventional compression molding, injection molding, blow molding and extrusion techniques. The compositions can be used for automotive parts, e.g. automotive boots, seals, gaskets, tubing, reinforced hose, film and sheeting.

DESCRIPTION OF PREFERRED EMBODIMENTS

The crystalline polyolefin resins used in the present invention are crystalline substantially saturated homopolymers or copolymers of polymerized monomer units of $C_2-C_8$ alpha monoolefins. Representative alpha monoolefins include ethylene, propylene, butene, pentene, hexane, 2-methyl-1-propene, 3-methyl-1-pentene, 4-methyl-1-pentene, 5-methyl-1-hexene and mixtures thereof. Polyethylene, either high density, low density, or linear low density; polypropylene or copolymers of ethylene and propylene are especially preferred. The polyolefin resins are added to and are present in the composition in amounts of from about 5-95 by weight, preferably, 25-70 parts by weight. Generally, when polyethylene or polypropylene is used in this invention they have melt indices in the range of from about 0.07-80 dg/min at 190°-230° C.

The melt processible thermoplastic composition also contains 5-95 parts by weight, preferably 30-75 parts by weight, of an ethylene-containing copolymer. The ethylene-containing copolymer comprises (1) ethylene, (2) a monomer selected from the group consisting of alkyl acrylates or alkyl methacrylates wherein the alkyl group contains 1-6 carbon atoms, or a vinyl ester of a monocarboxylic acid having 2-6 carbon atoms and (3) glycidyl acrylate or glycidyl methacrylate. The ethylene-containing copolymer contains 30-90 weight percent ethylene units, preferably 35-80 weight percent; 8-70 weight percent, preferably 15-65 weight percent, alkyl acrylate or alkyl methacrylate units or 8-70 weight percent, preferably 15-65 weight percent, units of vinyl esters of monocarboxylic acids having 2-6 carbon atoms, e.g., vinyl acetate; and 0.5-20 weight percent, preferably 3-12 weight percent, units of glycidyl acrylate or glycidyl methacrylate. Representative alkyl acrylates and alkyl methacrylates that are used in the ethylene-containing copolymer are methyl acrylate, ethyl acrylate, propyl acrylate, isopropyl acrylate, n-butyl acrylate, isobutyl acrylate, pentyl acrylates, hexyl acrylates, methyl methacrylate, ethyl methacrylate, propyl methacrylate, butyl methacrylates, hexyl methacrylates. Normal butyl acrylate and ethyl acrylate are preferred alkyl acrylates because they result in thermoplastic compositions having superior low temperature properties. Representative vinyl esters include vinyl acetate, vinyl propionate, vinyl butyrates, vinyl caproates. Vinyl acetate is preferred because such vinyl esters readily polymerize in the composition and they are commercially available.

The ethylene-containing copolymers that are used in the compositions of the present invention can be prepared by direct copolymerization, for example, copolymerizing ethylene, an alkyl acrylate or vinyl ester, and glycidyl methacrylate or glycidyl acrylate in the presence of a free-radical polymerization initiator at elevated temperatures, preferably 100°-270° C., and most preferably 130°-230° C., and at elevated pressures, preferably at least 70 MPa, and most preferably 140-350 MPa. The most preferred ethylene-containing copolymers that are used in the invention are copolymers of ethylene, n-butyl acrylate or vinyl acetate and glycidyl methacrylate.

When polar and nonpolar polymers are blended usually the blend exhibits very poor physical properties because of poor interfacial adhesion of the polymer and a compatabilizer is added to the blend to obtain a composition having good physical properties. Although about 1-30 parts by weight of a polymeric compatibilizer for the polyolefin resin and ethylene-containing copolymers can be added to the composition, quite surprisingly, a compatibilizer is not necessary to obtain very satisfactory physical properties. However, such compatibilizers show some improvement in physical properties, most notably, tensile strength. Polymeric compatibilizers that can be used include: polyethylene grafted with fumaric acid, polypropylene grafted with fumaric acid, and ethylene/propylene copolymers grafted with fumaric acid, polyethylene grafted with maleic acid, chlorinated polyethylene, chlorinated polypropylene, poly(propylene-acrylic acid), poly(ethylene-acrylic acid), poly(ethylene-methacrylic acid) and poly(propylene-ethylene-acrylic acid).

An important feature of the present invention is the necessity to crosslink the ethylene-containing copolymer component of the composition having epoxy (glycidyl) groups. The methods employable for crosslinking ethylene-containing copolymers having epoxy groups are well known by those skilled in the art of epoxy resins. Crosslinking is carried out by using any one or more well known crosslinking agents for epoxy resins.

Basic crosslinking agents for the ethylene-containing copolymer having epoxy groups include: Lewis bases including inorganic bases such as alkali metal hydroxides, e.g. KOH; organic bases including primary, secondary and tertiary amines and amides, for example, polyamides. Primary aliphatic and aromatic amines include triethylenetetramine, melamine, and m-phenylenediamine. Representative secondary amines are diethylamine and cyclic diamines such as piperazine. Included in this class are carboxylic acid salts of polyamines such as diacetates of cyclic diamines, for example, piperazinium diacetate. Representative tertiary amines include benzyldimethylamine, s-triazine, triallycyanurate, poly(ethylene/dimethylaminoethylethacrylate), and pyridine and tertiary amine salts and quaternary bases such as the 2-ethylhexanoate salt of tris(-dimethylaminomethyl)phenol.

Acid crosslinking agents for the ethylene-containing copolymer having epoxy groups include: Lewis acids such as BF3 and AlCl3 and their salts and certain organic salts of polyvalent metals such as zinc stearate and stannous octoate; diphenols such as bisphenol A; organic acids such as adipic acid, polymers with reactive acid end or pendent groups such as poly(ethyleneterephthalate) or poly(ethylenemethacrylic acid); anhydrides such as 3,3',4,4'-benzophenone tetracarboxylic dianhydride.

Especially preferred crosslinking agents, because they provide thermoplastic compositions having low compression set values, are those with at least two reactive functional groups per molecule, for example, aliphatic or aromatic polycarboxylic acids, polyanhydrides, and polyphenols. Examples of polycarboxylic acids, especially dicarboxylic acids, include adipic, decandioic, dodecandioic, glutaric and azelaic acids and unsaturated acids such as monoallyl itaconate. Representative polycarboxylic anhydrides are 3,3'4,4'-benzophenone tetracarboxylic dianhydride, succinic anhydride, itaconic anhydride, and pyromellitic dianhydride. Representative polyphenols are bisphenol A, 1,5-naphthalenediol resorcinol, and novalacs. Adipic acid and piperazinium diacetate are the most preferred crosslinking agents used in this invention.

Crosslinking agents for epoxy resin curing systems that can be used in the process of this invention are further disclosed in the "Handbook of Epoxy Resins", H. Lee and K. Neville, McGraw Hill Book Company, New York 1967.

It is a characteristic of the crosslinking process involving the preferred di- or polyfunctional crosslinking agents that larger amounts are used as compared to processes employing catalytically active crosslinking agents. These di- or polyfunctional crosslinking agents are converted into residues incorporated as crosslinks into the crosslinked ethylene-containing copolymer component of the thermoplastic composition of the present invention. The presence of the residues of the crosslinking agent can be demonstrated by analytical techniques available to those skilled in the art.

After selecting a specific crosslinking agent, preliminary guidance for selecting the amount of the crosslinking agent to be used and the conditions of time and temperature in which to accomplish the crosslinking process can be obtained from routine trials involving only crosslinking the ethylene-containing copolymer having epoxy groups. Processes using amounts and conditions leading to attractive low compression set values for the crosslinked ethylene-containing copolymer itself are useful for the blend of polymers constituting the thermoplastic compositions of the present invention. It has been found that incremental addition of the crosslinking agent to the composition prevents premature curing in some instances and one obtains a lower viscosity composition. Although the amount of crosslinking agent used can vary over a wide range depending on its reactivity, the amount of filler and other additives in the composition, typically, such amounts of crosslinking agent range from about 0.1-12 parts by weight, usually 0.5-8 parts by weight, of the ethylene-containing copolymer. Although the amount of crosslinking agent used can be more than 12 parts by weight, there is no advantage in using larger amounts.

The multi-phase melt processible thermoplastic composition is prepared by mixing the crystalline polyolefin resin, the uncrosslinked ethylene-containing copolymer and crosslinking agent by any one of a number of well known procedures for mixing elastomers, for example, in an internal mixer, on a two-roll mill or in an extruder. The mixing is performed at a temperature high enough to soften the polymers for adequate mixing, but not so high as to degrade the polymers. Generally, mixing is performed at temperatures of from about 100°–350° C., usually 150°–250° C. Crosslinking is conducted during mixing and shearing the thermoplastic composition, i.e., dynamically crosslinking the ethylene-containing copolymer. Mixing and shearing are carried out for a time sufficient to allow for crosslinking the ethylene-containing copolymer and for comminuting the crosslinked ethylene-containing copolymer. Adequacy of mixing can be determined by observing the processibility of the thermoplastic compositions by means of a piston rheometer.

Although not essential components of the thermoplastic composition of this invention, preferably, especially from a cost standpoint, various amounts of conventional fillers or compounding ingredients normally used with elastomers may be admixed with the thermoplastic compositions of this invention. Examples of such ingredients include processing oils, such as hydrocarbon extending oils, e.g. aromatic oils, paraffinic oils or naphtenic oils; fillers, such as various carbon blacks, clays, silica, alumina, calcium carbonate; pigments, such as titanium dioxide; antioxidants; stabilizers; flame retardants; smoke suppressants; processing aids such as lubricants and waxes; and plasticizers such as dialkylphthalates, dialkyladipates, dialkylglutarates and trialkylmellitates. It is preferable to add processing oils, plasticizers and fillers to the thermoplastic composition to improve its processing characteristics and the particular amounts used depend, at least in part, upon the quantities of other ingredients in the composition and the desired properties of the composition. The processing oils can be added before or after crosslinking has occurred.

The melt processible multi-phase thermoplastic compositions of the subject invention can be processed using conventional plastic processing equipment. The thermoplastic compositions of the present invention exhibit properties generally only associated with vulcanized rubber. For example, compositions of the present invention usually have tensile strength values of about 6.9-27.6 MPa (1000-4000 psi) and compression set values of from about 0-80%. Compositions in which the polyolefin is polyethylene show a particularly unexpected advantage of having low compression set values. Various uses for the multi-phase thermoplastic compositions include wire and cable jackets, seals and gaskets, automotive parts, sheet liners, packaging films, weather stripping, fuel line hose and connectors, and mechanical goods. Further, melt processible thermoplastic compositions within the scope of this invention can be fabricated into tubing for laboratory, medical and industrial uses. Such tubing can also be used as the inner tube of reinforced hoses, wherein the extruded tube is overlaid with wire or textile cords, applied as a spiral, knit or braid. Optionally, a polymeric covering can be applied (extruded, spiral wound or calendered sheet) over the reinforced tubing to provide protection from the working environment and mechanical abuse. Compositions within the scope of this invention can be used as the protective covering of reinforced tubes of similar or different composition.

EXAMPLES

Polymer Test Methods

Test specimens were cut from slabs compression molded at 220°, 250° or 190° C., as indicated, to determine physical properties. The test methods used were:

| | |
|---|---|
| $T_B$ = Tensile strength at break at 8.5 mm/s | ASTM D412 |
| $E_B$ = Elongation at break at 8.5 mm/s | ASTM D412 |
| Compression set after 22 hr/70° C. or 100° C., method B | ASTM D395 |
| Trouser tear, 21 mm/s | ASTM D1938 |
| Permanent set, % | ASTM D412 |
| $M_{100}$ = Modulus at 100% elongation | ASTM D412 |

Stress-strain and tear-strength measurements were run on test specimens approximately 1.5 mm in thickness. Stress-strain measurements were run using non-standard dumbbells having the following dimensions using the standard dumbbell nomenclature of ASTM D412:

A=13 mm, C=83 mm, L=44 mm, W=6.4 mm.

Compression sets were measured using 13 mm diameter discs die cut from slabs of about 1.5 mm thick and piled up to a thickness of about 13 mm. Specimens used for the tear-strength measurements were 37×75 mm rectangles slit lengthwise from one end to the center. All tests were run in duplicate or triplicate.

The following examples in which parts and percentages are by weight, unless otherwise indicated, are illustrative of the present invention.

Examples 1-4

Polypropylene and ethylene/n-butyl acrylate/glycidyl methacrylate (EBAGMA) were charged to an internal mixer equipped with cam-style blades. The temperature of the mixer was 180° C. and the mixer was operated at 100 rpm. The composition was mixed for 10 minutes. The crosslinking agent, adipic acid, was added to the composition in the amount indicated and the composition was mixed and sheared for 5 minutes to crosslink the ethylene-containing copolymer having epoxy groups (glycidyl). Control experiments A and B were conducted in the same manner as Examples 1–4 but since no adipic acid was added, mixing was continual for 15 minutes.

TABLE 1

| Composition | 1 | 2 | 3 | 4 | Control A | Control B |
|---|---|---|---|---|---|---|
| EBAGMA[1] | 75 | 67 | 60 | 50 | 67 | 50 |
| Polypropylene[2] | 25 | 33 | 40 | 50 | 33 | 50 |
| Adipic Acid, | 2.3 | 2.3 | 2.3 | 2.3 | — | — | ple B show the poor compression set resistance obtained without crosslinking agent.

TABLE 1-continued

| Composition | 1 | 2 | 3 | 4 | Control A | Control B |
|---|---|---|---|---|---|---|
| phr[3] Adipic Acid, parts | 1.73 | 1.54 | 1.38 | 1.15 | — | — |

Examples 5-14

The procedure described above in Examples 1-4 was substantially repeated except that various fillers, oils and additives listed below were added to the composition in the mixer.

TABLE 2

| Composition | 5 | 6 | 7 | 8 | 9 | 10 | 11 | 12 | 13 | 14[5] |
|---|---|---|---|---|---|---|---|---|---|---|
| EBAGMA[1] | 67 | 67 | 67 | 67 | 67 | 67 | 67 | 67 | 67 | 45 |
| Polypropylene[2] | 33 | 33 | 33 | 33 | 33 | 33 | 33 | 33 | 33 | 55 |
| MT Black | — | 10 | 30 | 50 | — | — | — | — | 50 | — |
| SRF Black | — | — | — | — | — | — | — | 50 | — | — |
| Paraffinic Oils | — | — | — | — | 10 | — | — | — | — | 20 |
| Di-2-ethylhexyl phthalate | — | — | — | — | — | 10 | — | 30 | 30 | — |
| Napthenic Oils | — | — | — | — | — | — | 10 | — | — | — |
| Clay[3] | — | — | — | — | — | — | — | — | — | 20 |
| Ditridecyl Adipate | — | — | — | — | — | — | — | — | — | 20 |
| Titanium Dioxide | — | — | — | — | — | — | — | — | — | 2 |
| Antioxidant[4] | — | — | — | — | — | — | — | — | — | 2 |
| Adipic acid | 1.5 | 1.5 | 1.5 | 1.5 | 1.5 | 1.5 | 1.5 | 1.5 | 1.5 | — |
| Piperazinium Diacetate | — | — | — | — | — | — | — | — | — | 2.2 |

The thermoplastic composition were compression molded at 220° C. for 5 minutes. The polymer blend in the mold was cooled with circulating water. The thermoplastic composition had the following physical properties.

The thermoplastic compositions were compression molded at 220° C. for 5 minutes. The thermoplastic composition had the following physical properties.

| Physical Properties: | 5 | 6 | 7 | 8 | 9 | 10 | 11 | 12 | 13 | 14 |
|---|---|---|---|---|---|---|---|---|---|---|
| $T_B$, MPa | 16.3 | 12.7 | 13 | 13.4 | 13.9 | 14.5 | 12.2 | 11.2 | 11.9 | 11.2 |
| $E_B$, % | 300 | 180 | 150 | 120 | 330 | 350 | 300 | 180 | 250 | 220 |
| Compression Set at 70° C., 22 hours, % | 36 | 31 | 29 | 23 | 45 | 45 | 47 | 15 | 20 | 56[6] |
| Hardness D | 43 | 41 | 43 | 45 | 33 | 34 | 33 | 34 | 30 | 41 |

[1]64.5 wt. % ethylene/31 wt. % n-butyl acrylate/4.5 wt. % glycidyl methacrylate
[2]Melt index 0.4 dg/min at 230° C.
[3]Clay is a treated calcined clay (dehydroxylated aluminum silicate) of particle size 1.1 and pH 5-6.
[4]Tetrakis [methylene(3,5-di-tert.-butyl-4-hydroxyhydrocinnamate)] methane (Irganox ® 1010).
[5]The same properties were obtained when 0.6 parts piperidine was substituted for the piperazinium diacetate.
[6]Compression Set at 100° C. for 22 hours.

moplastic composition had the following physical properties.

| Physical Properties | 1 | 2 | 3 | 4 | Control A | Control B |
|---|---|---|---|---|---|---|
| $M_{100}$, MPa | 7.2 | 8.8 | 10.3 | 12.5 | — | — |
| $T_B$, MPa | 11.8 | 16.3 | 19.0 | 23.4 | 4 | 9.6 |
| $E_B$, % | 250 | 300 | 360 | 420 | 130 | 70 |
| Comp. Set, 70° C., 22 hours, % | 8 | 36 | 54 | 70 | 90 | 98 |
| Hardness Shore D | 39 | 43 | 41 | 48 | 23 | 40 |
| Trouser Tear, 21 mm/sec., kN/m | 19 | | | | | |

[1]64.5 wt. % ethylene/31 wt. % n-butyl acrylate/4.5 wt. % glycidyl methacrylate
[2]melt index 0.4 dg/min at 230° C.
[3]phr - parts per hundred parts of ethylene-containing copolymer The above results show that using various ratios of polypropylene to EBAGMA the compositions have excellent compression set values and elongation at break whereas control Example A and Control Exam- The above test results illustrate that the compositions of this invention retain their elastomeric properties with fillers and other additives.

Examples 15-21

The procedure described above in Examples 1-4 was substantially repeated with various ethylene-containing copolymers and crystalline polyolefins listed below.

TABLE 3

| Composition | 15 | 16 | 17 | 18 | 19 | 20 | 21 |
|---|---|---|---|---|---|---|---|
| EBAGMA[1] | 67 | — | — | — | 67 | 65 | 60 |
| EBAGMA[2] | — | 67 | — | — | — | — | — |
| EEAGMA[3] | — | — | — | 60 | — | — | — |
| EVAGMA[4] | — | — | 67 | — | — | — | — |
| Polypropylene[5] | 33 | 33 | 33 | 40 | — | — | — |
| Polypropylene[6] | — | — | — | — | 33 | — | — |
| Polypropylene[7] | — | — | — | — | — | 35 | — |
| Ethylene/Propylene Copolymer[8] | — | — | — | — | — | — | 40 |
| Adipic Acid | 1.5 | 1.5 | 1.5 | 1.8 | 1.5 | 1.2 | 1.4 |

The thermoplastic compositions were compression molded at 220° C. for 5 minutes. The thermoplastic compositions had the following physical properties.

| Physical Properties | 15 | 16 | 17 | 18 | 19 | 20 | 21 |
|---|---|---|---|---|---|---|---|
| $M_{100}$, Mpa | 8.8 | 9.8 | 10 | 9.5 | 9.1 | 9.6 | 6.4 |
| $T_B$, Mpa | 16.3 | 15.1 | 14.7 | 17.5 | 15.7 | 14.6 | 9.2 |

-continued

| Physical Properties | 15 | 16 | 17 | 18 | 19 | 20 | 21 |
|---|---|---|---|---|---|---|---|
| $E_B$, % | 300 | 210 | 210 | 260 | 290 | 250 | 170 |
| Perm. Set, % | 110 | 50 | 60 | 140 | 100 | 100 | 60 |
| Comp. Set, 70° C., 22 hours, % | 36 | 28 | 35 | 50 | 33 | 45 | 41 |
| Hardness Shore D | 43 | 39 | 36 | 47 | 37 | 40 | 35 |

[1] 64.5 wt. % ethylene/31 wt. % n-butyl acrylate/4.5 wt. % glycidyl methacrylate
[2] 64 wt. % ethylene/28 wt. % n-butyl acrylate/8 wt. % glycidyl methacrylate
[3] 66 wt. % ethylene/28 wt. % ethyl acrylate/6 wt. % glycidyl methacrylate
[4] 62 wt. % ethylene/32 wt. % vinyl acetate/6 wt. % glycidyl methacrylate
[5] melt index 0.4 dg/min at 230° C.
[6] melt index 0.8 dg/min at 230° C.
[7] melt index 1.2 dg/min at 230° C.
[8] melt index 7 dg/min at 230° C.

Examples 22-23

The procedure described above in Examples 1-4 was substantially repeated with the ingredients listed below in the amounts given.

TABLE 4

| Composition | 22 | 23 |
|---|---|---|
| Polyethylene[1] | — | 33 |
| Polyethylene[2] | 33 | — |
| EBAGMA[3] | 67 | 67 |
| Adipic Acid | 1.5 | 1.5 |

The thermoplastic compositions were compression molded at 220° C. for 5 minutes. The thermoplastic compositions had the following physical properties.

| Physical Properties: | 22 | 22'[4] | 23 |
|---|---|---|---|
| $T_B$, MPa | 14.6 | 13.4 | 13 |
| $E_B$, MPa | 350 | 320 | 400 |
| Permanent Set, % | 105 | 130 | 120 |
| Compression Set at, 70° C., 22 hours | 24 | 25 | 32 |
| Hardness D | 35 | 34 | 28 |
| Trouser tear, 21 mm/sec, kN/m | 11 | — | — |

[1] Low density polyethylene, Melt Index 0.6 dg/min. at 190° C.
[2] High density polyethylene, Melt Index 6.5-7 dg/min at 190° C.
[3] 64.5 wt. % ethylene/31 wt. % butyl acrylate/4.5 wt. % glycidyl methacrylate
[4] Tests on remolded samples: A 10 × 15 cm molded plaque of the composition prepared in Example 20 is cut into pieces approximately 2.5 × 2.5 cm and remolded at 220° C. Polymer tests were run on the remolded samples. Properties of the remolded samples given above are seen to be very similar to properties of the first molded samples, which shows that the composition is thermoplastic and retains substantially its physical properties.

Examples 24-28

The procedure described above in Examples 1-4 was substantially repeated with the ingredients listed below in the amounts given.

TABLE 5

| Composition | 24 | 25 | 26 | 27 | 28 |
|---|---|---|---|---|---|
| EBAGMA[1] | 67 | 67 | 67 | 67 | 65 |
| Polyethylene[2] | 33 | 33 | — | 33 | — |
| Polyethylene[3] | — | — | 33 | — | — |
| Polyethylene[4] | — | — | — | — | 35 |
| SRF Black | — | 50 | 50 | — | 30 |
| MT Black | — | — | — | 50 | — |
| Di-2-ethylhexylphthlate | — | 30 | 30 | 30 | — |
| Aromatic Oil | — | — | — | — | 15 |
| Adipic acid | 1.5 | 1.5 | 1.5 | 1.5 | 1.0 |

The thermoplastic compositions were compression molded at 220° C. for 5 minutes. The thermoplastic compositions had the following physical properties.

| Physical Properties: | 24 | 25 | 26 | 27 | 28 |
|---|---|---|---|---|---|
| $T_B$, MPa | 14.6 | 10 | 7.4 | 8.5 | 11.7 |
| $E_B$, % | 350 | 240 | 210 | 150 | 230 |
| Permanent Set, % | 110 | 50 | 40 | 19 | 90 |
| Compression Set, 70° C., 22 hours, % | 24 | 0 | 15 | 4 | 25 |
| Compression Set, 100° C., 22 hours, % | — | 9 | — | — | — |
| Hardness D | 35 | 29 | 27 | 29 | 41 |

[1] 64.5 wt. % ethylene/31 wt. % n-butyl acrylate/ 4.5 wt. % glycidyl methacrylate
[2] High density polyethylene, Melt Index 6.5-7 dg/min at 190° C.
[3] Low density polyethylene, Melt Index 0.6 dg/min at 190° C.
[4] High density polyethylene containing 1.0 wt. % 1-octane, melt index 12 dg/min at 190° C.

The above results show the advantage in compression set resistance when the polyolefin is polyethylene.

Examples 29-34

The procedure described above in Examples 1-4 was substantially repeated with the ingredients listed below in the amounts indicated except a compatibilizer was added in Examples 30-32 and 34, and Examples 33-34 were prepared by mixing the ingredients in a 28 mm twin screw extruder at 170° C. with a residence time of 1.2 minutes and at a production rate of 8 lbs./hr. The addition of a compatibilizer improves the tensile strength of the thermoplastic composition.

TABLE 6

| Composition | 29 | 30 | 31 | 32 | 33 | 34 |
|---|---|---|---|---|---|---|
| EBAGMA[1] | 67 | 67 | 67 | 67 | 67 | 67 |
| Polypropylene[2] | 33 | 33 | 27 | 33 | — | — |
| PP-MA[3] | — | 6 | 12 | — | — | — |
| PP-Acrylic Acid[4] | — | — | — | 10 | — | — |
| Polyethylene[5] | — | — | — | — | 33 | 21 |
| Polyethylene-MA[6] | — | — | — | — | — | 12 |
| SRF Black | — | — | — | — | 30 | 30 |
| Aromatic Oil | — | — | — | — | 15 | 15 |
| Adipic Acid | 1.5 | 1.5 | 1.5 | 1.5 | 1.0 | 1.2 |

The thermoplastic compositions were compression molded at 220° C. for 5 minutes. The thermoplastic compositions had the following physical properties.

| Physical Properties: | 29 | 30 | 31 | 32 | 33 | 34 |
|---|---|---|---|---|---|---|
| $T_B$, MPa | 16.3 | 18.4 | 18.7 | 17.6 | 9.0 | 14.8 |
| $E_B$, % | 300 | 310 | 350 | 290 | 250 | 260 |
| Permanent Set, % | 110 | 110 | 220 | 110 | 90 | 90 |
| Compression Set, 70° C., 22 hours, % | | | | | | |

-continued

| Physical Properties: | 29 | 30 | 31 | 32 | 33 | 34 |
|---|---|---|---|---|---|---|
| Hardness D | 43 | 40 | 35 | 40 | 37 | 42 |

[1] 64.5 wt. % ethylene/31 wt. % n-butyl acrylate/4.5 wt. % glycidyl methacrylate
[2] Melt index 0.4 dg/min at 230° C.
[3] Polypropylene - maleic anhydride (0.27% grafted)
[4] Polypropylene - ethylene-acrylic acid (6% grafted)
[5] High density polyethylene, melt index 2.8 dg/min at 190° C.
[6] Polyethylene-maleic anhydride (1% grafted)

Example 35

The following ingredients described in Table 7 were dry blended by tumbling in a polyethylene bag. The blend was removed from the bag and fed at a rate of 6 to 11 pounds per hour into a 28 mm Werner and Pfleiderer extruder which had two sets of kneading blocks and reverse bushings and operated at 200–210 rpm to mix and shear the composition. The extruder vacuum port was maintained at 27.5 inches vacuum. The barrel temperatures of the extruder were 160° C. and the die temperature was 180° C. The melt exiting the extruder was quenched in water and the resulting thermoplastic composition was cut into pellets.

TABLE 7

| EBAGMA[1] | 66 wt. % |
|---|---|
| Polypropylene[2] | 33.8 wt. % |
| Antioxidant[3] | 0.5 wt. % |
| Adipic Acid | 0.2 phr[4] |

[1] 64.5 wt. % ethylene/31 wt. % butyl acrylate/4.5 wt. % glycidyl methacrylate
[2] melt index - 0.4 at 230° C.
[3] Irganox ® 1010 Tetrakis [methylene(3,5-di-tert.-butyl-4-hydroxyhydrocinnamate)] methane - 0.5 wt. % based on sum of other ingredients
[4] phr - parts per 100 parts of ethylene-containing copolymer Pellets from the thermoplastic blend were compression molded at 250° C. using a 3 minute cycle of light contact followed by 1 minute at 7 MPa. The polymer blend in the mold was cooled with circulating water. The thermoplastic composition had the following physical properties using ASTM D-412 measured at 23° C. and 100° C.

| | 23° C. | 100° C. |
|---|---|---|
| $T_B$, MPa | 8.64 | 0.96 |
| $E_B$, % | 195 | 150 |
| $M_{100}$, MPa | 8.71 | 0.89 |
| Compression Set after 22 hrs./70° C., Method B - 84% | | |

Example 35A

The extrudate of Example 35 was remelted in the extruder under the conditions described in Example 35 and 0.2 phr adipic acid was added to the composition in the extruder to obtain a second extrudate. The second extrudate was tested in the same manner using the same tests as described in Example 35.

| | 23° C. | 100° C. |
|---|---|---|
| $T_B$, MPa | 8.26 | 1.24 |
| $E_B$, % | 100 | 70 |
| $M_{100}$, MPa | 8.40 | — |
| Compression Set after 22 hrs./70° C., Method B - 64% | | |

Example 35B

The extrudate of Example 35A was remelted in the extruder under the conditions described in Example 35 and 0.6 phr adipic acid was added to the composition in the extruder to obtain a third extrudate. The third extrudate was tested in the same manner using the same tests as described in Example 35.

| | 23° C. | 100° C. |
|---|---|---|
| $T_B$, MPa | 11.85 | 2.99 |
| $E_B$, % | 160 | 95 |
| $M_{100}$, MPa | 9.90 | ND |
| Compression Set after 22 hrs./70° C., Method B - 64% | | |

Example 35C

The extrudate of Example 35B was remelted in the extruder under the conditions described in Example 35 and 0.6 phr adipic acid was added to the composition in the extruder to obtain a fourth extrudate. The fourth extrudate was tested in the same manner using the same tests as described in Example 35.

| | 23° C. | 100° C. |
|---|---|---|
| $T_B$, MPa | 11.50 | 3.94 |
| $E_B$, % | 160 | 105 |
| $M_{100}$, MPa | 9.30 | 3.90 |
| Compression Set after 22 hrs./70° C., Method B - 43% | | |

Example 36

A dry blend of 67 weight percent ethylene/n-butyl acrylate/glycidyl methacrylate (wt. ratio 64.5/31/4.5) and 33 weight percent polypropylene and 0.5 weight percent based on sum of other ingredients of Irganox ®1010 was added to an internal mixer. The temperature of the barrel of the mixer was raised to 270° C. After two minutes of mixing 0.23 phr of 3,3',4,4'-benzophenone tetracarboxylic dianhydride (BTDA) was added to the composition. After a total time of four minutes mixing and shearing, another 0.23 phr BTDA was added to the mixer, after a total time of six minutes mixing, 0.7 phr BTDA was added, and after a total time of eight minutes mixing, 0.7 phr BTDA was added for a total amount of BTDA of 1.86 phr. The blend was removed from the mixer after a total time of mixing and shearing of 10 minutes. The sample was compression molded as described above in Example 35 and the compression set value determined as described in Example 35 was 51%.

Example 37

A dry blend of 67 weight percent ethylene/n-butyl acrylate/glycidyl methacrylate (63.5/28/8.5 wt. ratio), 33 weight percent polypropylene and 0.5 weight percent based on the sum of other ingredients of Irganox ®1010 was added to an internal mixer. The temperature of the barrel of the mixer was raised to 200° C. While mixing and shearing incremental addition of the crosslinking agent, Bisphenol A, was added to the composition in the mixer in amounts of 0.5 phr in two minutes, followed by 1 phr four minutes after mixing commenced, 1.5 phr five minutes after mixing began and 1.5 phr six minutes after mixing began for a total concentration of Bisphenol A of 4.5 phr. The blend was removed from the mixer after a total time of ten minutes of mixing and shearing. The sample was compression molded at 190° C. as described in Example 35 and the compression set value determined as described in Example 35 was 72%.

Example 38

A mixture of 67 weight percent of ethylene/n-butyl acrylate/glycidyl methacrylate (63.5/28/8.4 weight ratio), 33 weight percent polypropylene and 0.5 weight percent based on the sum of the other ingredients of Irganox®1010 was added to a two-roll mill as a dry blend. The roll temperature was 200° C. After two minutes of mixing the polymer composition became molten and 0.2 phr adipic acid was added to the mixture and mixing and shearing was continued. The crosslinking agent was added by incremental additions as follows. After a total time of four minutes mixing, 0.4 phr adipic acid was added to the composition, after a total time of six minutes, 2 phr adipic acid was added, and after a total time of eight minutes of mixing and shearing, 2 phr adipic acid was added for a total mixing time of ten minutes.

The thermoplastic composition was removed from the mixer and compression molded at 190° C. and the following test were performed on samples.

|  | 23° C. | 100° C. |
|---|---|---|
| $T_B$, MPa | 13.71 | 5.48 |
| $E_B$, % | 265 | 653 |
| $M_{100}$, MPa | 9.49 | 1.24 |
| Compression Set after 22 hrs./70° C., Method B - 33% | | |

Example 39

A mixture of 67 weight percent of ethylene/n-butyl acrylate/glycidyl methacrylate (63.5/28/8.4 weight ratio), 33 weight percent polypropylene, and 0.5 weight percent based on the sum of the other ingredients of Irganox®1010 and 1 phr of an ethylene copolymer crosslinking agent that contained 4% methylene acrylic acid and 96% ethylene was added to a two-roll mill as a dry blend. The roll temperature of the mill was 200° C. After 2 minutes of mixing the composition became molten and an additional 1 phr of the ethylene copolymer crosslinking agent was added while mixing and shearing continued. After another 2 minutes of mixing and shearing an additional 2 phr of the ethylene copolymer crosslinking agent was added.

The thermoplastic composition was compression molded at 190° C. and the following tests were performed on the composition.

|  | 23° C. |
|---|---|
| $T_B$, MPa | 9.94 |
| $E_B$, % | 100 |
| $M_{100}$, MPa | 9.94 |
| Compression Set after 22 hrs./70° C., Method B - 92% | |

Example 40

A dry blend of 67 weight percent of ethylene/n-butyl acrylate/glycidyl methacrylate (63.5/28/84 weight ratio), 33 weight percent polypropylene and 0.5 weight percent based on the sum of the other ingredients of Irganox®1010 was added to an internal mixer. The temperature of the barrel of the mixer was 200° C. Incremental addition of the crosslinking agent stannous octate was added in amounts of 0.1 phr, 0.3 phr, 0.7 phr, and 1 phr at periods of 2, 4, 6 and 8 minutes, respectively, for a total concentration of 2.1 phr crosslinking agent and a total of 10 minutes of mixing and shearing.

The thermoplastic composition was compression molded at 190° C. and the composition had a compression set value of 63% after 22 hrs. at 70° C., Method B.

We claim:

1. A melt processable multi-phase thermoplastic composition comprising a blend of:
   (A) 5–95 parts of weight of a crystalline thermoplastic polyolefin resin of a substantially saturated homopolymer or copolymer of polymerized monomer units of $C_2$–$C_8$ alpha monoolefin forming one phase of the composition, and
   (B) 5–95 parts by weight of a dynamically crosslinked ethylene-containing copolymer forming a second phase of the composition comprising units derived from: (1) ethylene, (2) alkyl acrylates or alkyl methacrylates wherein the alkyl group contains 1–6 carbon atoms, or vinyl esters of monocarboxylic acids having 2–6 carbon atoms, and (3) glycidyl acrylate or glycidyl methacrylate, the crosslinking being carried out using one or more epoxy resin cross linking agents.

2. A melt processable composition of claim 1 where the crosslinked ethylene-containing copolymer comprises units derived from: (1) ethylene, (2) alkyl acrylates or alkyl methacrylates having 1–6 carbon atoms in the alkyl group, and (3) glycidyl acrylate or glycidyl methacrylate.

3. A melt processable composition of claim 2 wherein the crosslinked ethylene-containing copolymer comprises units derived from (1) 30–90 weight percent ethylene, (2) 8–70 weight percent butyl acrylate and (3) 0.5–20 weight percent glycidyl acrylate or glycidyl methacrylate.

4. A melt processable composition of claim 2 wherein the crystalline polyolefin resin comprises polymerized monomer units of ethylene or propylene.

5. A melt processable composition of claim 4 containing 20–75 parts by weight of the crystalline polyolefin and 25–80 parts by weight crosslinked ethylene-containing copolymer.

6. A melt processable composition of claim 1 wherein the crosslinked ethylene-containing copolymer comprises units derived from: (1) ethylene, (2) vinyl esters of a monocarboxylic acids having 2–6 carbon atoms, and (3) glycidyl acrylate or glycidyl methacrylate.

7. A melt processable composition of claim 6 wherein the crosslinked ethylene-containing copolymer comprises units derived from (1) 30–90 weight percent ethylene, (2) 8–70 weight percent vinyl acetate, and (3) 0.5–20 weight percent glycidyl acrylate or glycidyl methacrylate.

8. A melt processable composition of claim 6 wherein the crystalline polyolefin resin comprises polymerized monomer units of ethylene or propylene.

9. A melt processible composition of claim 8 containing 20–75 parts by weight of the crystalline polyolefin resin and 25–80 parts by weight of the crosslinked ethylene-containing polymer.

10. A melt processible thermoplastic composition of claim 1 wherein the crystalline polyolefin resin comprises polymerized monomer units of ethylene.

11. A melt processible thermoplastic composition of claim 1 wherein the crystalline polyolefin resin comprises polymerized monomer units of propylene.

12. A melt processible thermoplastic composition of claim 1 containing a hydrocarbon oil.

13. A melt processible thermoplastic composition of claim 1 containing plasticizer, oils and fillers.

14. A melt processible multi-phase thermoplastic composition comprising a blend of a crystalline thermoplastic polyolefin resin and an ethylene-containing copolymer which comprises:
   (a) 25–70 parts by weight of a crystalline thermoplastic polyolefin resin comprising polymerized monomer units of ethylene or propylene forming one phase of the composition, and
   (b) 30–75 parts by weight of a dynamically crosslinked ethylene-containing copolymer forming a second phase of the composition comprising units derived from (1) ethylene, (2) butyl acrylate or vinyl acetate and (3) glycidyl acrylate or glycidyl methacrylate, the cross-linking being carried out using one or more epoxy resin cross linking agents.

15. A process for making a melt processible multi-phase thermoplastic composition of a blend of a crystalline polyolefin resin and a dynamically crosslinked ethylene-containing copolymer which comprises:
   (1) adding to a mixer
   (A) 5–95 parts by weight of a crystalline polyolefin resin of a substantially saturated homopolymer or copolymer of polymerized monomer units of a $C_2$–$C_8$ alpha monoolefin, and
   (B) 5–95 parts by weight of an uncrosslinked ethylene-containing copolymer comprising units derived from (1) ethylene; (2) an alkyl acrylate or alkyl methacrylate wherein the alkyl group contains 1–6 carbon atoms, or vinyl esters of monocarboxylic acids having 2–6 carbon atoms, and (3) glycidyl acrylate or glycidyl methacrylate,
   (C) a crosslinking agent for the ethylene-containing copolymer, and
   (2) mixing and shearing the composition at a temperature sufficient to soften the polyolefin resin and to crosslink and comminute said ethylene-containing copolymer resulting in the crosslinked ethylene-containing copolymer being dispersed as a phase throughout the crystalline polyolefin resin.

16. A process for making a melt processible multi-phase composition of claim 15 which comprises adding to the mixer the uncrosslinked ethylene-containing copolymer comprising units derived from ethylene/alkyl acrylates or alkyl methacrylates having 1–6 carbon atoms/glycidyl acrylate or glycidyl methacrylate.

17. A process for making a melt processible multi-phase composition of claim 16 which comprises adding to the mixer the uncrosslinked ethylene-containing copolymer comprising units derived from ethylene/butyl acrylate/glycidyl acrylate or glycidyl methacrylate.

18. A process for making a melt processible multi-phase composition of claim 17 wherein the crystalline polyolefin resin is polyethylene or polypropylene.

19. A process for making a melt processible multi-phase composition of claim 15 which comprises adding to the mixer the uncrosslinked ethylene-containing copolymer comprising units derived from ethylene/vinyl esters of a monocarboxylic acid having 2–6 carbon atoms/glycidyl acrylate or glycidyl methacrylate.

20. A process for making a melt processible composition of claim 19 which comprises adding to the mixer the uncrosslinked ethylene-containing copolymer comprising units derived from ethylene/vinyl acetate/glycidyl acrylate or glycidyl methacrylate.

21. A process for making a melt processible composition of claim 20 wherein the crystalline polyolefin resin is polyethylene or polypropylene.

22. A process for making a melt processible thermoplastic composition of claim 15 which comprises adding to the mixer the crystalline polyolefin resin polyethylene.

23. A process for making a melt processible thermoplastic composition of claim 15 wherein the crosslinking agent is an aromatic or aliphatic dicarboxylic acid.

24. A process of claim 23 wherein the aliphatic dicarboxylic acid is adipic acid.

25. A process for making a melt processible thermoplastic composition of claim 15 wherein the crosslinking agent is a diacetate of a cyclic diamine.

26. A process for making a melt processible thermoplastic composition of claim 15 which comprises adding to the mixer the crystalline polyolefin resin polypropylene.

27. A process for making a thermoplastic composition of claim 15 which comprises adding plasticizers, oils and fillers to the composition in the mixer.

28. A process for making a melt processible thermoplastic composition of claim 15 which comprises adding to the mixer a hydrocarbon oil.

29. A process for making a melt processible thermoplastic composition comprising a blend of a crystalline polyolefin resin and a dynamically crosslinked ethylene-containing copolymer which comprises:
   (1) adding to a mixer
   (A) 25–70 parts by weight of the crystalline polyolefin resin polyethylene, polypropylene or copolymers thereof, and
   (B) 30–75 parts by weight of an uncured elastomer of an ethylene copolymer that consists essentially of units derived from ethylene/butyl acrylate/glycidyl acrylate or glycidyl methacrylate, and
   (C) a crosslinking agent for the ethylene-containing copolymer, and
   (2) mixing and shearing the composition at a temperature sufficient to soften the polyolefin resin and ethylene-containing copolymer and to crosslink and comminute said ethylene-containing copolymer resulting in the crosslinked ethylene-containing copolymer forming a separate phase in the crystalline polyolefin resin.

30. A process of claim 29 wherein the polyolefin is polypropylene.

31. A process of claim 29 wherein the polyolefin is polyethylene.

32. A process of claim 29 wherein the crosslinking agent is adipic acid.

33. A process of claim 29 wherein the crosslinking agent is piperazinium diacetate.

34. A process of claim 25 wherein the cyclic diamine is piperazinuim diacetate.

* * * * *